United States Patent [19]
Nelson

[11] 3,791,069
[45] Feb. 12, 1974

[54] ORCHARD TREE COVERING DEVICE

[76] Inventor: Roy A. Nelson, 1419 Mahon, Richland, Wash. 99352

[22] Filed: Aug. 30, 1972

[21] Appl. No.: 285,107

[52] U.S. Cl. .................................... 47/21, 214/332
[51] Int. Cl. ............................................. A01g 13/02
[58] Field of Search ..................... 47/20, 21, 26, 1

[56] References Cited
UNITED STATES PATENTS

| | | | |
|---|---|---|---|
| 3,395,485 | 8/1968 | Rooklidge | 47/20 |
| 3,228,144 | 1/1966 | Homan | 47/1 |
| 1,957,994 | 5/1934 | Eccher | 47/20 |
| 1,611,271 | 12/1926 | Hammond et al. | 47/21 UX |
| 1,757,276 | 5/1930 | Vaughn | 47/21 UX |

Primary Examiner—Robert E. Pulfrey
Assistant Examiner—R. T. Rader
Attorney, Agent, or Firm—Wells, St. John & Roberts

[57] ABSTRACT

An orchard tree covering device is described for use in placing individual covers or strips of cover material over orchard trees to prevent frost damage. The device is adapted to fit on conventional tractors and includes an adjustable elevational support and a cover holding magazine. The magazine is designed to hold a plurality of covers and includes means for selectively releasing individual covers onto trees below. In an alternate form, the covers are connected in strips and rolled onto spools. The strips may then be reeled out by the device over long rows of trees.

4 Claims, 15 Drawing Figures

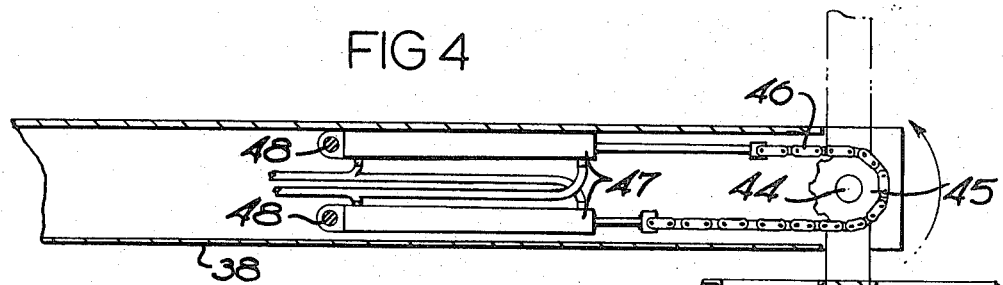
FIG 4
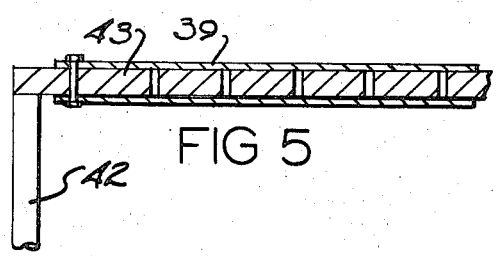
FIG 5
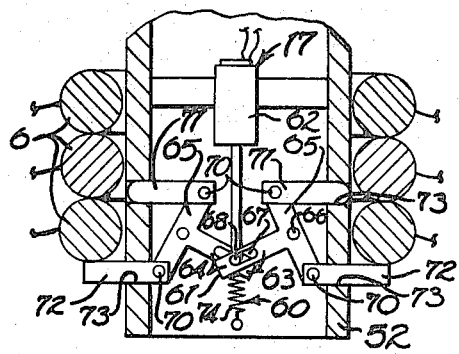
FIG 6
FIG 8
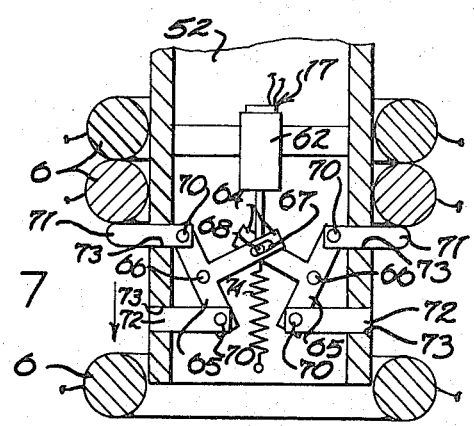
FIG 7

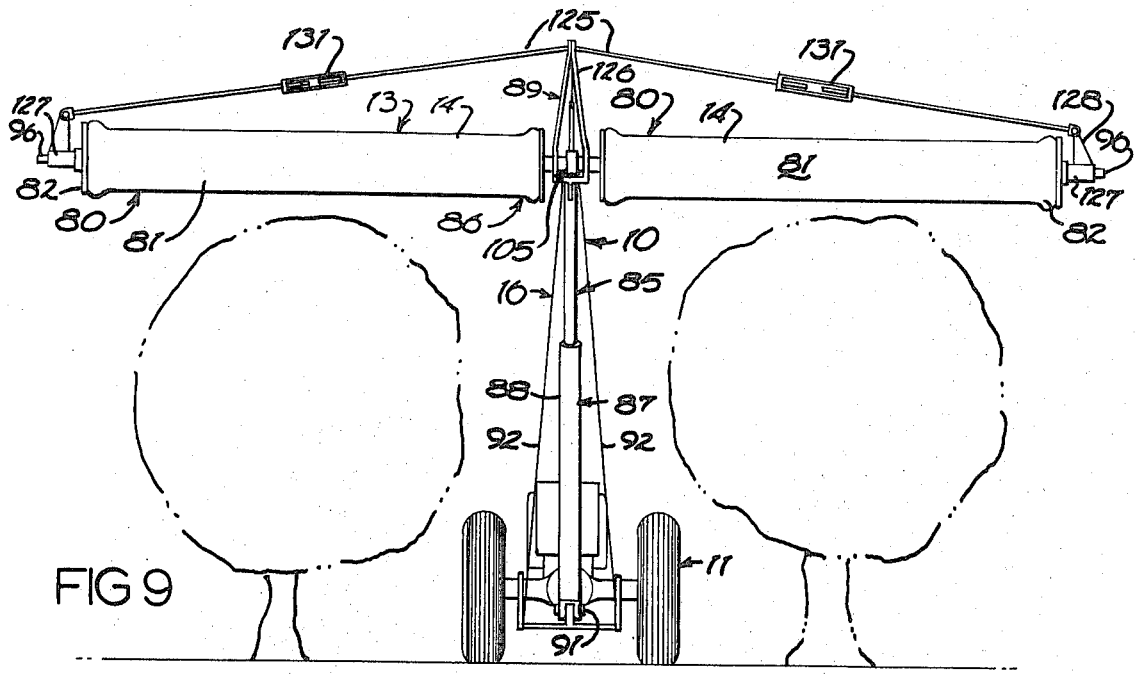
FIG 9
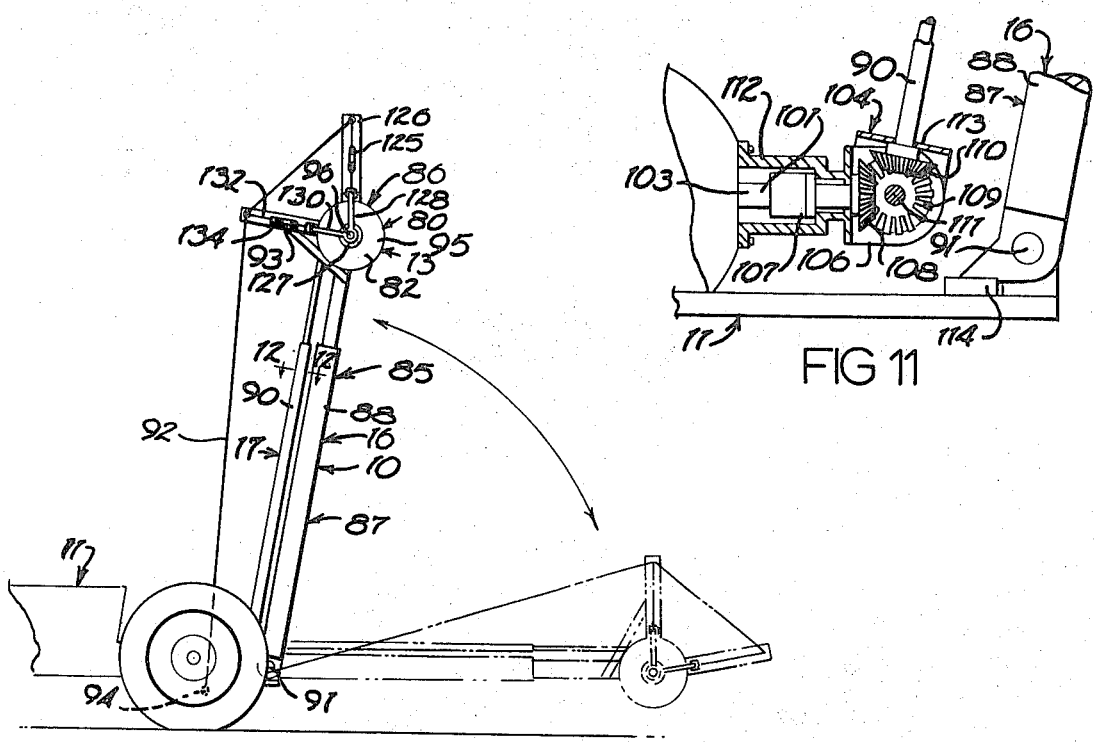
FIG 10
FIG 11

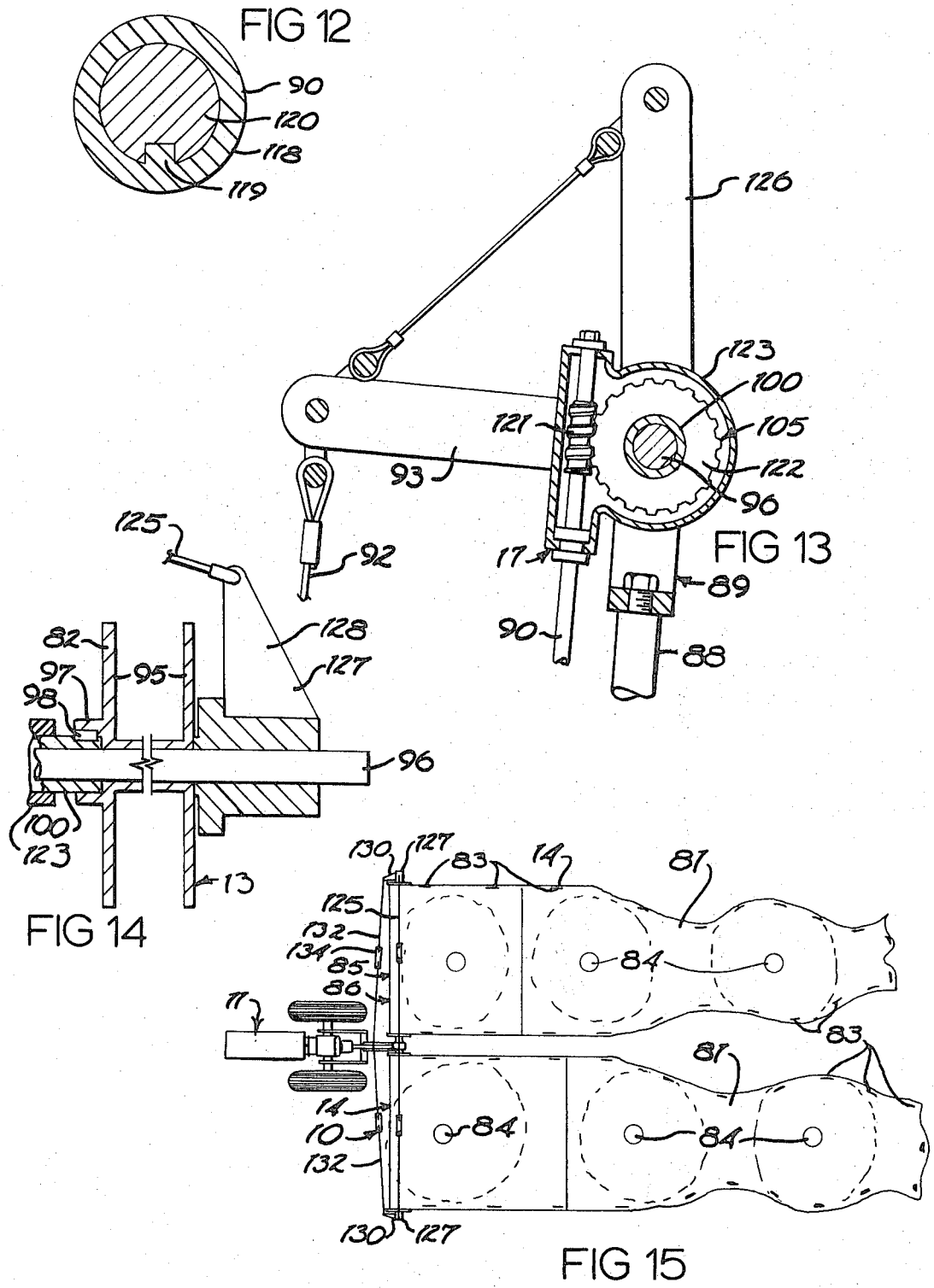

ORCHARD TREE COVERING DEVICE

BACKGROUND OF THE INVENTION

The present invention relates basically to the field of fruit growing and more particularly to apparatus for protecting such fruit from frost. Presently the most frequently utilized apparatus for protecting fruit trees from frost are "smudge pots" or containers for burning oil or other material to create a dense cloud of smoke for enveloping whole orchards. This method has proven effective for preventing frost damage to orchards but air pollution from the smudge creates an additional problem, especially in areas already plagued by pollution from other industries.

It is therefore the primary object of this invention to provide a device for effectively preventing frost damage to fruit trees without danger of air pollution therefrom.

An additional object is to provide an orchard tree covering device that is reusable and therefore inexpensive to operate.

A further object is to provide such a device that is adapted to be mounted to conventional farm tractors.

A yet further object is to provide such a device that does not harm insects or prevent pollination thereby.

Another object is to provide such a device that may be operated to quickly and efficiently cover orchard trees.

These and other objects and advantages will become evident upon reading the following description which, taken with the accompanying drawings, describe a preferred and alternate form of the invention.

A BRIEF DESCRIPTION OF THE DRAWINGS

FIG. 4 is a sectioned side elevational view taken along line 4—4 in FIG. 2;

FIG. 5 is a fragmentary sectional view illustrating an adjusting component of a cover magazine means of my invention;

FIG. 6 is an enlarged view of a cover release mechanism of my invention;

FIG. 7 is a view similar to FIG. 6 only illustrating a different operational position of the release mechanism;

FIG. 8 is a plan view of a single cover;

FIG. 9 is a rear elevational view of a second embodiment of my invention mounted to a tractor and positioned between two rows of fruit trees;

FIG. 10 is a fragmentary side elevational view of the apparatus illustrated by FIG. 9 with a lowered position shown by dashed lines;

FIG. 11 is a fragmentary side elevational view illustrating the linkage to a power take-off of a tractor;

FIG. 12 is a sectional plan view taken along line 12—12 in FIG. 10;

FIG. 13 is a fragmentary side sectional view taken along line 13—13 in FIG. 9;

FIG. 14 is a fragmentary sectional view of a cover spool and spool collar; and

FIG. 15 is a diagrammatic plan view illustrating the operation of the apparatus of the second form of my invention.

DESCRIPTION OF A PREFERRED AND ALTERNATE EMBODIMENT OF THE INVENTION

Figure 1:
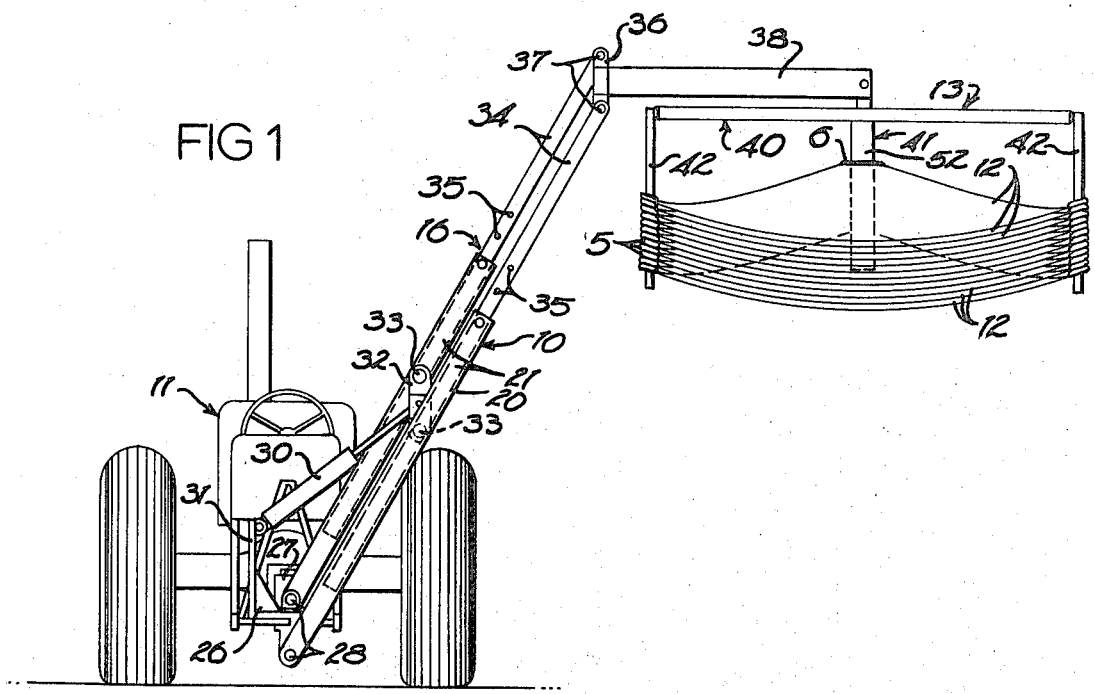
FIG. 1 is a rear elevational view of a preferred form of my invention mounted to a tractor.

Referring now to the drawings, the tree covering device may be seen generally designated by the reference numeral 10. A preferred form of device 10 is shown by FIGS. 1 thru 8 and an alternate form is illustrated by FIGS. 9 thru 15.

The device illustrated in FIGS. 1 thru 8 is mountable to a conventional wheel tractor as shown at 11 in FIG. 1 for selectively depositing individual frost protective covers 12 over trees. The device 10 of the alternate form provides capability for placing a pair of elongated covers 14 over a plurality of trees in two adjacent rows.

The covers utilized by the device 10 of the preferred form may best be seen in FIG. 8. As illustrated, the covers constructed of cloth, preferably cotton and are rectangular in configuration having heavy metal rings 5 attached to the corners thereof. A slightly larger ring 6 is located at the center of the cover. Rings 5 and 6 are utilized to releasably support the covers on device 10 and further, when a cover is placed over a tree, rings 5 serve to hold the cover edges down against wind, and the opening through ring 6 provides access for bees or other pollination assisting insects.

Device 10 of the preferred form generally comprises a magazine means 13 for elevationally supporting a vertically oriented stack of covers 12, a vertically adjustable means 16 for supporting the magazine 13 and a control means 17 for selectively releasing individual covers 12.

Figure 2:
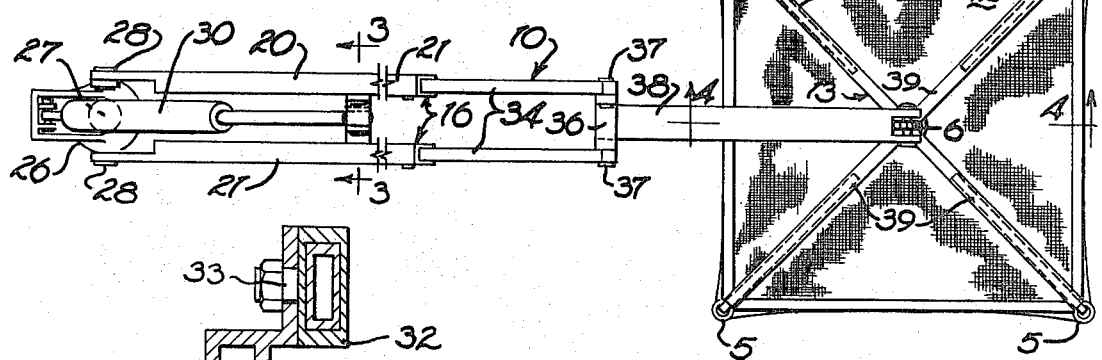
FIG. 2 is a plan view of the apparatus illustrated by FIG. 1.

FIGS. 1 and 2 illustrate the adjustable support means 16 as a parallelogram linkage 20 comprising an elongated pair or extendable arms 21 pivotably mounted to a tractor 11 by a base 26 at the lower ends thereof. Base section 26 is mounted to tractor 11 for pivotal movement about a vertical axis defined by a pivot pin 27. Arms 21 are also pivotable about the horizontal axes of a pair of vertically spaced pivot pins 28 extending through arms 21 and into base 26. Arms 21 are also spaced slightly apart along the axes of pins 28 to facilitate movement of the arms to a vertical position. Pins 28 allow angular movement of arms 21 as initiated by a hydraulic cylinder assembly 30.

Figure 3:
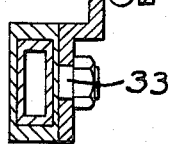
FIG. 3 is an elevational cross section taken along line 3—3 in FIG. 2.

Cylinder 30 has one end mounted to an upright section 31 of base 26 with the other end operatively connected to arms 21 by a bracket 32. As seen in FIG. 3, bracket 32 mounts the piston shaft end of cylinder 30 between arms 21 to further facilitate movement of arms 21 to a vertical position, and to evenly distribute pulling forces exerted by cylinder 30 to both arms 21. Bracket 32 is vertically oriented between arms 21 and pivotably mounted thereto by a vertically aligned pair of pivot pins 33. The horizontal axes of pins 33 are parallel to the axes defined by pins 28 to assure parallel relation between the outer ends and the inner ends of arms 21 regardless of their angular position.

Arms 21 are extendable by means of a pair of telescoping extensions 34 which slidably fit within arms 21. This adjusting means comprises an aligned row of holes 35 in each extension 34. Length may be adjusted by aligning a selected hole 35 with a complementary hole in arm 21 and placing an adjusting bolt through both arm 21 and extension 34. The adjusting means and cylinder 30 facilitate elevational adjustment of the magazine 13 to accommodate trees of varying height.

The upper ends of extensions 34 provide pivotal support for a bracket 36 which completes a final link in the parallelogram linkage 20. Bracket 36 includes a pair of horizontal pivot pins 37 extending therethrough and connected to extensions 34. The pivotal axes of pins 37 are parallel to pins 28 and 33.

A horizontal member 38 extends outwardly from bracket 36 to provide support for the magazine 13 depending therefrom. Member 38 is held rigidly by bracket 36 and therefore because of the parallelogram linkage will remain in a horizontal orientation at any given angular position of arms 21.

Magazine 13 is suspended at the outer end of member 38 by an angularly pivotable core section 41. Core 41 comprising an inner member 51 and an outer member 52, is located at the center of a rectangular magazine framework 40 fixed to outer core member 52 by diagonal support channels 39 which support downwardly projecting tubular legs 42. The legs 42 are spaced from core 41 a distance similar to the distance from the central ring 6 to the corner rings 5 of a cover 12. FIG. 1 illustrates a vertical stack of covers 12 supported by legs 42 and core 41. The corner rings 5 each fit over a complementary leg section 42 while the center ring 6 fits over the core 41. The stack is held in place on core 41 and legs 42 by a cover release assembly 60 which will be described in greater detail below.

Legs 42 are outwardly extendable for receiving covers of varying dimension. FIG. 5 shows a typical leg 42 fixed to an extendable adjusting member 43. Each member 43 is slidably held within a diagonal support channel 39 and includes a row of spaced apertures through which an adjusting bolt may be secured when aligned with a complementary hole in channel 39. Such adjustment facilitates use of different size covers 12 as dictated by the size of the fruit trees to be covered.

Magazine 13 is angularly movable adjacent the end of member 38 about the horizontal axis of a shaft 44 extending through member 38 and an inner member 51 of core 41. Member 51 is rigidly fixed to the shaft 44 which in turn is pivotably held by member 38. A sprocket 45 is fixed to shaft 44 and is engaged by a length of chain 46 (FIG. 4). The ends of chain 46 are attached to the piston shafts of a pair of hydraulic cylinders 47. Both cylinders 47 are held within member 38 by pins 48 extending therethrough. Cylinders 47 are connected to a source of hydraulic pressure (supplied by tractor 11) in such a manner that they will operate simultaneously but oppositely. Thus if one cylinder is activated to extend, the other will simultaneously retract. Such movement rotates sprocket 45 and thereby the magazine 13 between the operative position shown in solid lines in FIG. 4 and a loading position partially shown by dashed lines. At the loading position, core 41 and legs 42 extend upwardly to aid in loading of covers 12 on the magazine 13.

The elevation of magazine 13 may be more easily controlled by a cylinder assembly 50 located within core 41. One end of cylinder 50 is fixed to inner core member 51 and the other end is fixed to the outer core member 52. Outer member 52 slidably fits over member 51 so that extension of cylinder 50 will telescope member 52 and magazine 13 away from support 38. This movement facilitates minor elevational adjustments of magazine 13 without necessitating readjustment of arms 21.

The release mechanism 60 previously mentioned may be seen in detail in FIGS. 6 and 7. The mechanism is mounted within the lower end of the outer core member 52. Basically, release mechanism 60 comprises a toggle escapement linkage 61 operated by a solenoid 62 of control means 17 to selectively release one cover 12 at a time. Linkage 61 includes an opposed pair of "T" shaped links 63 pivotably held at the intersection of their leg sections 64 and cross member 65 by pins 66 extending through to outer core member 52. The leg sections 64 of links 63 converge along common longitudinal slots 67. Both slots 67 are engaged by a slide pin 68 held at the end of the solenoid plunger. A pivot pin 70 extends through each end of cross member 65 to pivotally connect the inside ends of an upper and lower pair of escapement bars 71,72. Vertically spaced openings 73 are formed in core member 52 to slidably receive and guide the movement of bars 71, 72 in response to activation of solenoid 62. A tension spring 74 is connected between slide pin 68 and core member 52 to normally bias the toggle linkage toward the position illustrated in FIG. 6. In this position, the top escapement bars 71 are withdrawn into core member 52 and the lower bars 72 are extended to support the stack of covers 12 by the central ring 6 of the bottom cover 12. To release a cover, an operator may activate a switch (not shown) to retract the plunger of solenoid 62. As the plunger retracts the upper and lower escapement bars 71, 72 simultaneously extend and retract respectively. The support of the stack is thereby transferred to the upper bars 71 as they are extended while the lower bars 72 retract to release the bottom cover of the stack by removing support of its center ring 6. Deactivation of solenoid 62 then allows the plunger to extend again to the position shown in FIG. 6. During this movement, the upper bars 61 are retracted as the lower bars 72 are extended, thereby transferring support of the stack of covers back to the lower bars 72.

To operate device 10, the tractor driver may maneuver tractor 11 to position the device 10 adjacent a selected tree. He may then raise or lower the magazine 13 according to the tree height by selectively activating cylinder 50 to extend or retract through a conventional control switch (not shown). Once the magazine is located directly above the tree, the operator may release a single cover over the tree by activating solenoid 62 through a conventional electrical switch (also not shown). The tractor may then be maneuverrd to position the magazine over the next selected tree.

Reference will now be made to the alternate form of my invention as illustrated by FIGS. 9 thru 15.

In this particular embodiment, a continuous strip of frost protective covering 14 may be placed over a row of trees by magazine 13 in the form of a spool mechanism shown generally at 80. The frost protective strips (FIG. 15) are made up of a plurality of lengths of cover material 81 that are fastened end to end and rolled onto a spool or magazine 82. The longitudinal side edges and end strips include weights 83 fastened to the cover material to hold the sides and ends thereof down over the trees. A plurality of holes 84 are longitudinally spaced along the strips for access to the trees below by pollination assisting insects such as bees.

The strips are selectively reeled out or in by operation of the device 10 which, in this embodiment includes a substantially "T" shaped framework 85 mounted at the rear of a tractor 11. The cross member 86 of the frame supports two spools 82, one on either side of a leg section 87 which is mounted at the lower end thereof to tractor 11 (FIG. 9). Leg section 87 includes a pivotal hydraulic cylinder support assembly 88 and an extendable spool driveshaft 90.

Cylinder assembly 88 comprises the vertical adjusting means 16 of this embodiment which rotatably supports cross member 86 at its upper end and is mounted to tractor 11 at its lower end for movement about the horizontal axis of a pivot 91. Cylinder 88 may be selectively activated to extend or retract to raise or lower the spools to the positions shown in FIG. 10. A cable 92 assists cylinder 88 to raise and lower the spools by providing a fixed radius connection extending from the outer end of a first stationary strut member 93 extending from yoke 89 to a fixed pivot connection 94 on tractor 11 (FIG. 10) forward of and elevationally lower than pivot 91. With such a connection, if cylinder 88 is extended, cable 92 is forced to pivot upwardly thereby lifting the cylinder and spools. Likewise, if cylinder 88 is retracted, cable 92 will pivot downwardly lowering the cylinder and spools. The lowered position, illustrated in dashed lines in FIG. 10 facilitates loading and unloading of spools 82 onto cross member 86.

The spools 82 are shaped substantially like thread spools, each having circular plates 95 fixed at the ends of an elongated magazine tube. The tube includes a central bore extending from end to end of a diameter sufficient to allow the spool to slidably move over an elongated transverse mounting bar 96 of cross member 86. Each spool also includes a keyway (FIG. 14) adjacent an inside end 97 for receiving a key 98. Keys 98 are affixed to spool drive collars 100 which are operatively connected to the power take-off 101 of tractor 11.

FIG. 11 partially illustrates power take-off 101 which is usually a standard item on such tractors and used for supplying power to various farm implements or other tractor accessories. In this embodiment, the power take-off 101 is utilized to rotate spools 82 and thereby let out or take up the rolls of frost protective covering 81. The control means 17 of this embodiment comprises a mechanism utilized for selectively transferring rotational movement of the power take-off drive shaft 103 to rotational movement of spools 82 includes a universal drive connection 104, extendable drive shaft 90, and a work drive assembly 105.

Universal drive connection 104 basically comprises a conventional flexible gear turret 106 adapted to mount an input shaft 107 thereof to the power take-off output shaft 103 (FIG. 11). Rotational movement of shaft 103 is transferred through connection 104 to power the extendable drive shaft 90 by means of a bevel gear assembly comprising an input gear 108, an idler gear 109 and an output gear 110. Input gear 108 is connected by conventional means to power take off output shaft 103. Idler gear 109 is mounted for free rotational movement about the horizontal axis of an axle member 111. Axle 111 is rotatably held by a universal connector housing 112 which, in turn, is affixed to the tractor. Idler 109 is held in meshing engagement with both input gear 108 and output gear 110 to transfer rotational movement of the power take-off to the extendable shaft 90 affixed thereto. Output gear 110 is rotatably held by a "U" shaped bracket 113 mounted for free rotational movement on axle member 111. This facilitates free pivotal movement of output gear 110 and the attached extendable shaft 90 about the axis of axle 111. A pivot stop plate 114 is mounted as an integral part of cylinder assembly 88 adjacent pivot 91 to stop pivotal movement of the device 10 before output gear 110 is pivoted into engagement with input gear 108.

Extendable shaft 90 as shown in cross section in FIG. 12 includes an outer tubular member 118 and an inner telescoping member 120. Outer member 118 presents an inwardly protruding key 119 which fits into a complementary longitudinal slot in inner member 120. Key 119 and the complementary slot allow longitudinal extension of shaft 90 while preventing rotation of outer member 118 relative to inner member 120.

The upper end of shaft 90 includes a work 121 mounted thereon for operative engagement with a worm wheel 122 (FIG. 13). Wheel 122 is rotatably mounted on the mounting bar 96 of cross member 86 between spools 82. The spool drive collars 100 described above are affixed to worm wheel 122 for rotation therewith to drive the spools 82 either to take up or let out the strips of frost protective cover material 82. Worm 121 and worm wheel 122 are held within a protective housing 123 which also serves to hold worm 121 in engagement with worm wheel 122.

Spools 82 are held against drive collars 100 by a pair of guy cables 125 each extending from a second stationary strut member 126 of yoke 89 outwardly to a slidable support collar 127 at each end of spool mounting bar 96. Collars 127 each include two angularly spaced projecting ears 128, 130 (FIG. 10 and 14) extending radially outward from the mounting bar 96 a distance slightly greater than the radius of the adjacent spool end plate 95. Cables 125 are releasably connected at the outer ends of ears 128 to provide clearance for spools 82. When collars 127 are in place on bar 96, the tension of cables 125 between strut 126 and the collars serves both to hold the spools against drive collars 100 and to support the outer ends of spools 82 when elevated as shown in FIG. 9. A turnbuckle 131 is provided on each cable 125 to allow adjustment of cable tension.

A second pair of cables 132 extend from the first strut member 93 outwardly to ears 130 for support of the spools when in a lowered loading position as shown in dashed lines in FIG. 10. Cables 132 also include a pair of tension adjusting turnbuckles 134.

To remove spools 82 from the device, the operator simply lowers the spools to the loading position, releases tension on cables 132 and 125 and slides collar supports 127 off the ends of support bar 96. The spools presently mounted on the device may then be removed by pulling them outwardly over bar 96.

To reload spools onto the device, the spool bores adjacent inside ends 97 of spools 82 are first placed over the outer ends of bar 96. The spools 82 may then be pushed inwardly onto bar 96 until the inside ends engage drive collars 100 with the keys 98 and complementary spool keyways aligned.

As may be seen in FIG. 15, two adjacent rows of trees may be simultaneously covered by a continuous covering of material 81 as the tractor moves along between the rows. Successive strips of material from different spools may be joined together end to end by zippers or other fastening means to insure a continuous covering of complete rows. By loading empty spools 82 on the device, connecting the ends of two adjacent strips of material 81 to the spools, and driving forwardly toward the free ends of the strips, the operator may roll the material back onto the spools.

It may be obvious from the above descripiton that various changes and modifications may be made therein without departing from the intended spirit and scope of my invention. Therefore, only the following claims are to be taken as definitions of my invention.

What I claim is:

1. An apparatus for covering orchard trees with covers, each cover having a central ring and a plurality of spaced peripheral rings, said apparatus comprising:

a magazine for receiving and storing a stack of covers;

said magazine having a central elongated core to coaxially receive the center rings thereon and a plurality of elongated peripheral legs corresponding to the spaced peripheral rings to coaxially receive the peripheral rings thereon;

vertically adjustable means operatively connected to the magazine for supporting the magazine above the trees in an inverted orientation so that said central core and peripheral legs extend downwardly; and control means operatively connected to the magazine for selectively operating the magazine to release the covers one at a time from the magazine onto the trees.

2. The apparatus as defined in claim 1 wherein the magazine includes a relesase mechanism means mounted on a central core and operatively connected to the control means for holding the stack of covers on the magazine when the magazine is inverted and for releasing the covers one at a time in response to the control means to drop the cover onto the trees.

3. The apparatus as defined in claim 2 wherein the release mechanism means includes a toggle escapement linkage means pivotally mounted within the central core for releasably engaging the lowermost central ring when the magazine is inverted to releasably hold the lowermost cover in the magazine, said control means being operatively connected to the toggle escapement linkage means to selectively pivot the toggle escapement linkage means.

4. The apparatus as defined in claim 1 wherein the vertically adjustable means includes a lifting means for raising the magazine from ground level to an elevation above the trees.

* * * * *